US008260209B2

(12) United States Patent
Sanayei (10) Patent No.: US 8,260,209 B2
(45) Date of Patent: Sep. 4, 2012

(54) SYSTEM AND METHOD FOR COORDINATED SPATIAL MULTIPLEXING USING SECOND ORDER STATISTICAL INFORMATION (75) Inventor: Shahab Sanayei, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 395 days.

(21) Appl. No.: 12/620,668

(22) Filed: Nov. 18, 2009

(65) Prior Publication Data
US 2011/0115675 A1 May 19, 2011

(51) Int. Cl.
*H04B 17/00* (2006.01)
*H04B 1/00* (2006.01)
*H04B 7/00* (2006.01)
*H04B 7/02* (2006.01)
*H03C 7/02* (2006.01)
*H04M 1/00* (2006.01)

(52) U.S. Cl. ............ 455/67.11; 455/67.13; 455/69; 455/101; 455/562.1; 375/267

(58) Field of Classification Search ............ 455/67.11, 455/67.13, 69, 561, 562, 101, 103, 562.1; 375/132, 135, 138, 146, 147, 245, 260, 267, 375/299
See application file for complete search history.

(56) References Cited

U.S. PATENT DOCUMENTS

| 7,649,831 | B2 * | 1/2010 | Van Rensburg et al. | 370/203 |
| 2006/0056531 | A1 * | 3/2006 | Li et al. | 375/267 |
| 2006/0203891 | A1 * | 9/2006 | Sampath et al. | 375/132 |
| 2008/0132281 | A1 * | 6/2008 | Kim et al. | 455/562.1 |
| 2008/0273618 | A1 * | 11/2008 | Forenza et al. | 375/261 |
| 2009/0067402 | A1 * | 3/2009 | Forenza et al. | 370/343 |
| 2009/0274204 | A1 * | 11/2009 | Chen et al. | 375/228 |
| 2010/0056215 | A1 * | 3/2010 | Gorokhov et al. | 455/561 |
| 2010/0182967 | A1 * | 7/2010 | Zorba Barah et al. | 370/329 |
| 2010/0296591 | A1 * | 11/2010 | Xu et al. | 375/259 |
| 2011/0150114 | A1 * | 6/2011 | Miao et al. | 375/260 |

OTHER PUBLICATIONS

Chalise, B. K., et al., "Uplink to Downlink Spatial Covariance Matrix Transformation Concepts for Downlink Beamforming," Proceedings of the 3$^{rd}$ IEEE International Symposium on Signal Processing and Information Technology (ISSPIT), Dec. 2003, pp. 568-571.
Love, D. J., et al., "What is the Value of Limited Feedback for MIMO Channels?," Adaptive Antennas and MIMO Systems for Wireless Communications, IEEE Communications Magazine, vol. 42, No. 10, Oct. 2004, pp. 54-59.
Peel, C. B., et al., "A Vector-Perturbation Technique for Near-Capacity Multiantenna Multiuser Communication—Part I: Channel Inversion and Regularization," IEEE Transactions on Communications, vol. 53, No. 1, Jan. 2005, pp. 195-202.

* cited by examiner

*Primary Examiner* — Simon Nguyen
(74) *Attorney, Agent, or Firm* — Slater & Matsil, L.L.P.

(57) ABSTRACT

A system and method for coordinated spatial multiplexing using second order statistical information is provided. A method for controller operations includes receiving second order statistics from a plurality of communications devices, computing a beamforming vector for each communications device in the plurality of communications devices, selecting a subset of communications devices from the plurality of communications devices to receive transmissions, and transmitting transmissions to the subset of selected communications devices. The beamforming vector for a communications device is based on the second order statistics provided by the communications device, and the transmitting uses the computed beamforming vector for each selected communications device to transmit the transmissions to the selected communications device.

14 Claims, 4 Drawing Sheets

SYSTEM AND METHOD FOR COORDINATED SPATIAL MULTIPLEXING USING SECOND ORDER STATISTICAL INFORMATION

TECHNICAL FIELD

The present invention relates generally to wireless communications, and more particularly to a system and method for coordinated spatial multiplexing using second order statistical information.

BACKGROUND

Generally, in wireless communications systems using frequency division duplex (FDD), knowledge of downlink (DL) channel information may be essential for efficient beamforming to one or more users. The transmission of information to two or more users is commonly referred to as spatial multiplexing.

DL channel information may be provided by a receiver (e.g., a mobile station, a user, a terminal, a User Equipment, and so on) to a transmitter (e.g., a NodeB, an enhanced NodeB, a base station, a base terminal station, a relay station, and so forth) over a feedback channel. The receiver may estimate or measure the DL channel and then feed the DL channel information back to the transmitter. The DL channel information may be feedback in its raw form, a quantized version (a codeword from a codebook known by both the receiver and the transmitter), an index to the quantized version (an index to the codeword from the codebook), or so on.

However, feeding back DL channel information over the feedback channel may be costly and unreliable, especially when the DL channel is changing rapidly in time and/or frequency, such as when the receiver is moving rapidly, when there is significant interference and noise present in an operating environment of the wireless communications system, or the UE is operating in a multipath environment with a large bandwidth.

SUMMARY OF THE INVENTION

These and other problems are generally solved or circumvented, and technical advantages are generally achieved, by embodiments of a system and method for coordinated spatial multiplexing using second order statistical information.

In accordance with an embodiment, a method for controller operations is provided. The method includes receiving second order statistics from a plurality of communications devices, computing a beamforming vector for each communications device in the plurality of communications devices, selecting a subset of communications devices from the plurality of communications devices to receive transmissions, and transmitting transmissions to the selected subset of communications devices. The beamforming vector for a communications device is based on the second order statistics provided by the communications device, and the transmitting uses the computed beamforming vector for each selected communications device to transmit the transmissions to the selected communications device.

In accordance with another embodiment, a method for communications device operations is provided. The method includes estimating a communications channel between the communications device and a controller, estimating second order statistics for the communications channel based on the estimated communications channel, and transmitting the second order statistics to the controller. The second order statistics are used by the controller to compute a beamforming vector to be used in communications to the communications device.

In accordance with another embodiment, a controller is provided. The controller includes a scheduler that selects one or more communications devices for transmission in a transmission opportunity, a beamforming unit coupled to the scheduler, a beamforming vector compute unit that constructs a beamforming vector from channel feedback information provided by the selected communications devices, a single user unit coupled to the scheduler, to the beamforming unit, and to the beamforming vector compute unit, and a multi-user unit coupled to the scheduler, and to the beamforming unit. The beamforming unit maps information for the selected communications devices onto a beamforming vector for transmission. The beamforming vector compute unit computes the beamforming vector from second order statistics provided by the selected communications devices, and the second order statistics are conveyed in the channel feedback information. The single user unit provides single user beamforming vectors to the beamforming unit, the single user beamforming vectors are generated by the single user unit based on the selected communications devices and the second order statistics, and the multi-user unit provides multi-user beamforming vectors to the beamforming unit, the multi-user beamforming vectors are generated by the multi-user unit based on the selected communications devices and the second order statistics.

An advantage of an embodiment is that second order statistical information is used to provide channel information regarding a communications channel between a receiver and a transmitter. Since second order statistical information does not change as rapidly as time-frequency samples, the amount and frequency of channel information that must be fedback to the transmitter may be reduced.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system that makes use of channel information feedback to support spatial multiplexing to two users. The invention may also be applied, however, to wireless communications systems that supports spatial multiplexing to more than two users. Additionally, the invention may also be applied to wireless communications systems that support multi-terminal coordinated spatial multiplexing, such as wireless communications systems wherein multiple controllers or multiple controllers and relays may transmit to two or more users, such as Long Term Evolution, Long Term Evolution-Advanced, and so forth, compliant wireless communications systems.

Figure 1:
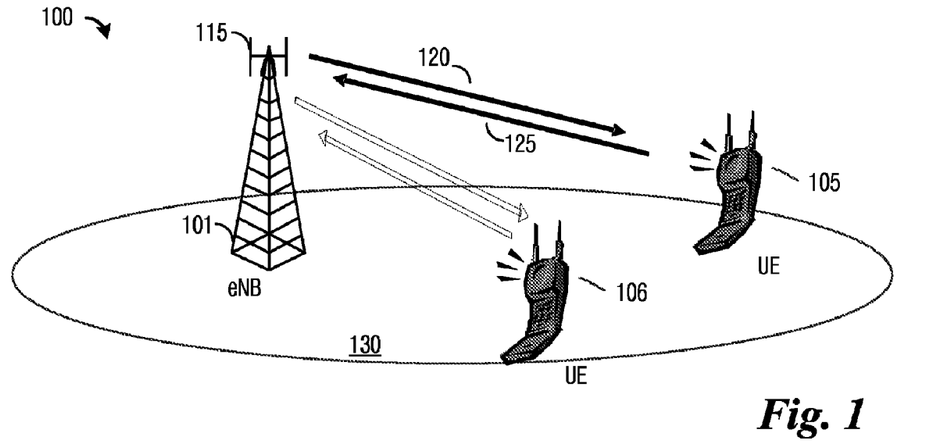
FIG. 1 is a diagram of a wireless communications system.

FIG. 1 illustrates a wireless communications system 100. Wireless communications system 100 includes an enhanced NodeB (eNB) 101 and a User Equipment (UE) 105 and UE 106, which may be mobile or fixed. eNB 101 and UE 105 and UE 106 may communicate using wireless communications. eNB 101 has a plurality of transmit antennas 115, while UE 105 and UE 106 may have one or more receive antennas. eNB 101 sends control information and data to UE 105 through DL channel 120, while UE 105 sends control information and data to eNB 101 through uplink (UL) channel 125. eNB 101 and UE 106 may also communicate over similar channels.

In general, an eNB, such as eNB 101, may also be referred to as a base station, base transceiver station, a NodeB, and so forth. Similarly, a UE, such as UE 105, may also be referred to as a subscriber unit, a user, a subscriber, a mobile station, a terminal, and so on.

UE 105 may send control information on UL channel 125 to improve the quality of the transmission on DL channel 120. eNB 101 may send control information on DL channel 120 for the purpose of improving the quality of uplink channel 125. A cell 130 is a conventional term for the coverage area of eNB 101. It is generally understood that in wireless communication system 100 there may be multiple cells corresponding to multiple eNBs, as well as multiple UEs.

Wireless communications systems equipped with multiple antennas may be capable of transmitting parallel stream of data to one or more UEs. This is known as spatial multiplexing. In transmitting parallel streams to more than one UE, the knowledge of the communications channel of the UEs are required at the eNB so that the eNB may pick a set of beams that cause the least amount of interference. When the eNB has access to the UEs' channel knowledge a well-known solution for this problem is commonly referred to as zero-forcing spatial multiplexing.

Let $y_k$ be the received signal, $h_k^H$ is the downlink channel response, $w_k$ is the unit norm beam vector, $s_k$ is the transmitted symbol ($E[|s_k|^2]=1$), $P_k$ is the power of the k-th user respectively and $n_k$ is the additive Gaussian noise at k-th user, then $$y_k = \sqrt{P_k}\, h_k^H w_k \cdot s_k + \sum_{j \neq k} \sqrt{P_j}\, h_k^h w_j \cdot s_j + n_k.$$

Therefore the zero forcing beam $w_k$ is given by projecting $h_k$ on the orthogonal sub-space formed by the other UEs. Let $$H=[\sqrt{P_1}h_1 \ldots \sqrt{P_k}h_k \sqrt{P_{k+1}}h_{k+1} \ldots \sqrt{P_N}h_N]$$

and $$P_k = H_k(H_k^H H_k)^{-1} H_k^H,$$

then $$w_k = \frac{P_k \cdot h_k}{\|P_k \cdot h_k\|}.$$

In practice, obtaining the channel knowledge of all UEs may be difficult in FDD wireless communications systems. It may be possible to either directly transmit the estimated channel vectors to the eNB (analog feedback) or use a codebook to quantize the channel vectors and then send a codebook index of the quantized channel vector to the eNB using a feedback channel. If the channel changes in time and/or frequency or if there is transmission delay, the transmitted feedback may not correctly represent the DL channel therefore the DL beams are not exact and there may be a corresponding performance loss.

On the other hand, second order statistical knowledge of the channel may be much more stable (because it depends on the geo-location of the scatterers as well as the structure of the antenna array). Therefore, it may be possible to accurately estimate a downlink correlation matrix at the UE from the time-frequency samples. The estimation of the downlink correlation matrix may be done either using downlink pilots (pilot-assisted) or data (blind) or both (semi-blind).

Let $R_k$ denote the spatial correlation of UE k, then $$R_k = P_k E[h_k h_k^H] \approx \frac{P_k}{|T||F|} \sum_{\substack{t \in T \\ f \in F}} h_k(t,f) h_k^H(t,f),$$

where t and f indicate the time and frequency indices of the estimated time-frequency samples and T and F represent the set of indices in time and frequency, respectively. In order to convey the knowledge of $R_k$ to the transmitter, a low-rate feedback channel may be used to transmit the quantized coefficients of $R_k$. The feedback of the quantized coefficients of $R_k$ needs to be done at a much slower rate compared to corresponding time-frequency samples of the channel. Another option may be to use UL measurements of the correlation matrix and use them for DL transmission. However, this technique only works well when the DL and UL channel frequency bands are not too far apart.

Figure 2A:
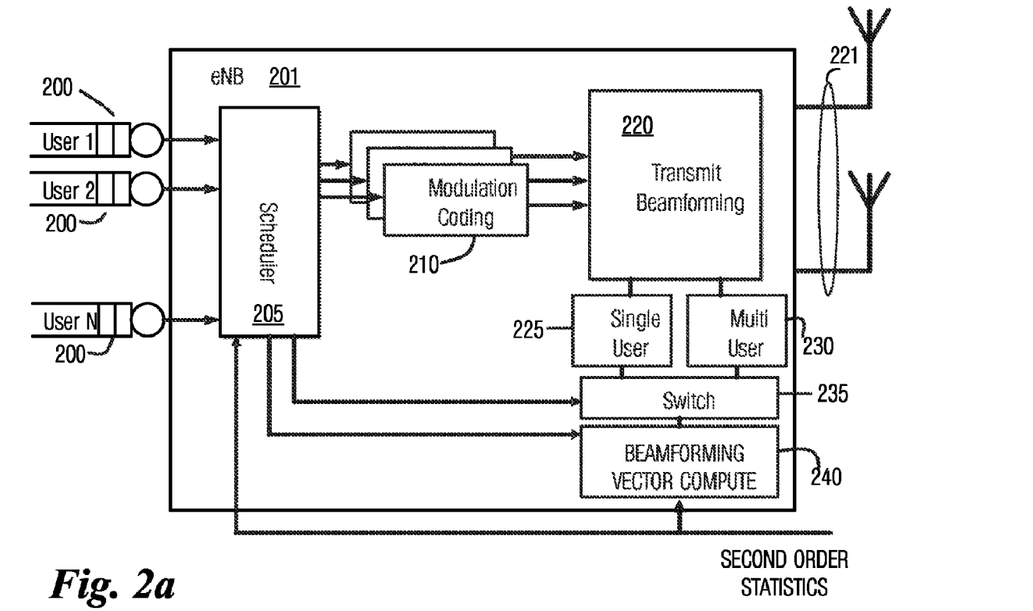
FIG. 2a is a diagram of an eNB that makes use of second order statistics from UEs to compute beamforming vectors.

FIG. 2a illustrates an eNB 201 that makes use of second order statistics from UEs to compute beamforming vectors.

Data 200 destined for a plurality of UEs being served, in the form of bits, symbols, or packets for example, may be sent to a scheduler 205, which may decide which UEs will transmit in a given time/frequency opportunity. Scheduler 205 may use any of a wide range of known scheduling disciplines in the literature including round robin, maximum sum rate, proportional fair, minimum remaining processing time, or maximum weighted sum rate. Generally scheduling decisions are based on channel quality information feedback (in the form of channel quality indicators or other short term information, for example) feedback from a plurality of UEs.

Data from UEs selected for transmission may be processed by modulation and coding block 210 to convert the data to transmitted symbols. Modulation and coding block 210 may also add redundancy for the purpose of assisting with error correction and/or error detection. A modulation and coding scheme implemented in modulation and coding block may be chosen based in part on information about the channel quality information feedback (in the form of channel quality indicators or other short term information).

The output of modulation and coding block 210 may be passed to a transmit beamforming block 220, which maps the output (a modulated and coded stream for each UE) onto a beamforming vector. The beamformed outputs may be coupled to antennas 221 through RF circuitry, which are not shown. The transmit beamforming vectors are input from a single user block 225 or a multi-user block 230.

Either beamforming for a single user or multiple user beamforming may be employed, as determined by switch 235, based on information from scheduler 205 as well as channel quality information feedback. Part of each user's channel quality information feedback includes second order statistics, which may be used by eNB 201 to compute beamforming vectors. The modulation/coding and beamforming may be repeated for all scheduled users based on the output from scheduler 205.

A beamforming vector compute block 240 produces beamforming vectors from the second order statistics included in the channel quality information feedback received from the UEs. The output of beamforming vector compute block 240 may be passed to switch 235, which in turn, forwards the information to either single user block 225 or multi-user block 230. Other information may also be passed to these blocks (single user block 225 or multi-user block 230), for example a signal-to-interference-plus-noise ratio (SINR) estimate may be passed to the multi-user block 230 to improve its performance. Single user block 225 may use the output of beamforming vector compute block 240 as the beamforming vector for the selected UE. Other processing may also be applied, such as interpolation in the case that orthogonal frequency division multiplexing (OFDM) modulation is employed.

Multi-user block 230 may combine information regarding the multiple selected UEs along with the beamforming vectors computed by beamforming vector compute block 240 to derive the transmit beamforming vectors to be employed for each UE. Multi-user block 230 may use any number of algorithms widely known in the literature including zero forcing, coordinated beamforming, minimum mean squared error beamforming, or lattice reduction aided precoding for example.

Figure 2B:
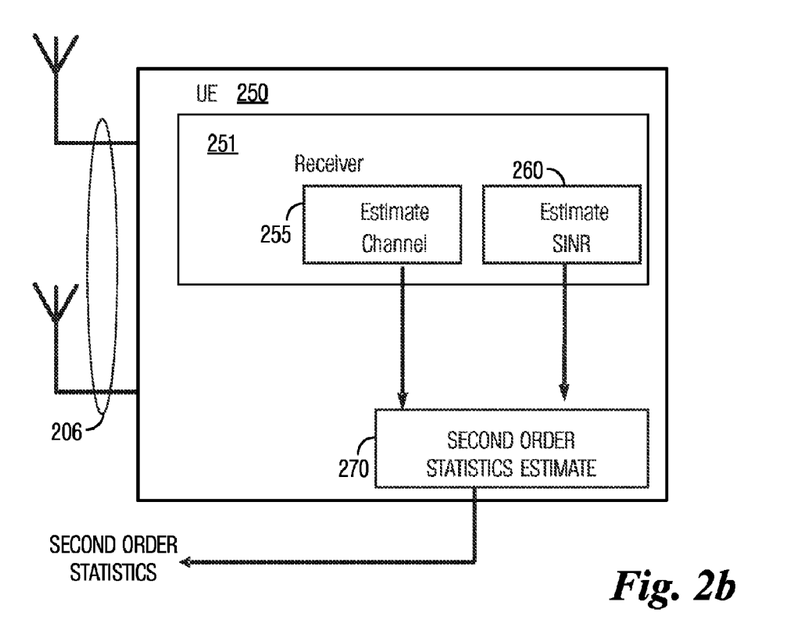
FIG. 2b is a diagram of a UE that provides channel information feedback to an eNB in the form of second order statistics.

FIG. 2b illustrates a UE 250 that provides channel information feedback to an eNB in the form of second order statistics. UE 250 may have one or a plurality of receive antennas 206, connecting through RF circuitry (not shown) to a receiver signal processing block 251. Some of the key functions performed by receiver signal processing block 250 may be channel estimation block 255 and estimate signal-to-interference-plus-noise ratio (SINR) block 260. Channel estimation block 255 uses information inserted into the transmit signal in the form of training signals, training pilots, or structure in the transmitted signal such as cyclostationarity to estimate coefficients of the channel between eNB 201 and UE 250, i.e., perform channel estimation.

The output of channel estimation block 255 (channel state information, for example) may be provided to second order statistics estimate block 270, which may estimate the second order statistics from the output of channel estimation block 255. Second order statistics estimate block 270 may also make use of estimated SINR from estimate SINR block 260 to estimate the second order statistics. The second order statistics (estimated) may be fedback to eNB 201 to be used to aid scheduling and transmit beamforming, for example. Prior to feeding back the second order statistics, the second order statistics may be quantized to reduce the amount of information being fedback.

Figure 3:
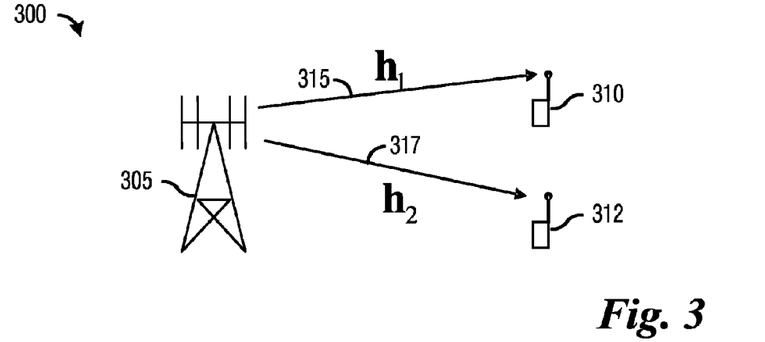
FIG. 3 is a diagram of a model of a wireless communications system communicating using spatial multiplexing using second order statistics for two UEs.

FIG. 3 illustrates a model of a wireless communications system 300 communicating using spatial multiplexing using second order statistics for two UEs. Wireless communications system 300 includes an eNB 305 communicating with two UEs, UE 310 and UE 312. A DL communications channel 315 between eNB 305 and UE 310 may be denoted $h_1$, while a DL communications channel 317 between eNB 305 and UE 312 may be denoted $h_2$.

Then a received signal at UE 310 may be expressed as:

$$y_1 = h_1^H w_1 \cdot s_1 + h_1^H w_2 \cdot s_2 + n_1,$$

and a received signal at UE 312 may be expressed as:

$$y_2 = h_2^H w_1 \cdot s_1 + h_2^H w_2 \cdot s_2 + n_2,$$

where $h_1^H$ and $h_2^H$ are DL channels for UEs 310 and 312, $w_1^H$ and $w_2^H$ are beamforming weights for UEs 310 and 312, $n_1^H$ and $n_2^H$ are additive white Gaussian noise with variance $\sigma^2$ corresponding to UEs 310 and 312, and $s_1$ and $s_2$ are transmitted signals for UEs 310 and 312.

Although the discussion focuses on two UEs, the embodiments may be extended to more than two UEs. Therefore, the discussion of two UEs participating in spatial multiplexing should not be construed as being limiting to either the scope or spirit of the embodiments.

Figure 4:
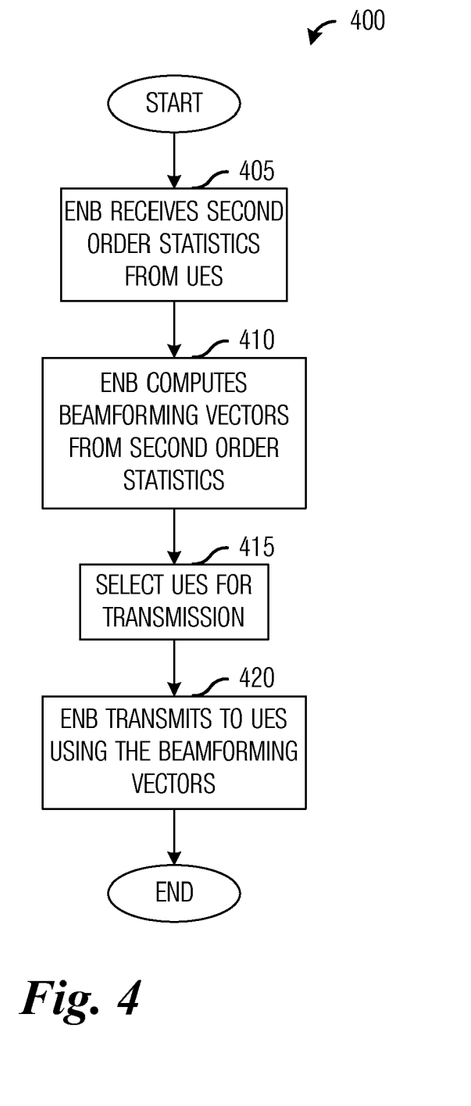
FIG. 4 is a flow diagram of eNB operations in transmitting information to UEs using spatial multiplexing and second order statistics.

FIG. 4 illustrates a flow diagram of eNB operations 400 in transmitting information to UEs using spatial multiplexing and second order statistics. eNB operations 400 may be indicative of operations taking place at an eNB, such as eNB 305. eNB operations 400 may occur while the eNB is in normal operations and may continue as long as the eNB has multiple UEs to transmit to using spatial multiplexing. eNB operations 400 may be scheduled to take place periodically. Alternatively, eNB operations 400 may occur when a performance measure, such as an error rate, throughput, or so on, meets a specified threshold, which may be an indication that the transmissions to the UEs are occurring at sub-optimum levels.

eNB operations 400 may begin with the eNB receiving second order statistics from the UEs (block 405). The second order statistics may be included in channel information feedback messages transmitted by the UEs. Since the communications channel between the eNB and each of the UEs may differ, each UE may need to provide its own second order statistics in its own channel information feedback messages to the eNB. In general, the eNB may receive second order statistics from a plurality of UEs. However, the discussion below focuses on the eNB receiving second order statistics from two UEs.

From the second order statistics, the eNB may be able to compute beamforming vectors (block 410). The eNB may compute the beamforming vectors in a beamforming vector compute unit, such as beamforming vector compute block 240. Optimally solving for the beamforming vectors from only second order statistics does not appear to be analytically tractable. Instead, a sub-optimal solution for two UE DL beamforming in a high signal-to-noise ratio (SNR) scenario may be feasible.

In post processing, DL SNR for the two UEs may be expressible as:

$$SNR_1 = \frac{P_1 \cdot |h_1^H w_1|^2}{P_2 \cdot |h_1^H w_2|^2 + \sigma^2} \text{ and } SNR_2 = \frac{P_1 \cdot |h_2^H w_2|^2}{P_2 \cdot |h_2^H w_1|^2 + \sigma^2}.$$

A sum-rate capacity for the two UEs may be expressed as:

$$C = \log_2(1+SNR_1) + \log_2(1+SNR_2).$$

A high SNR approximation for the sum-rate capacity may be expressed as:

$$C \approx \log_2(\overline{SNR_1} \cdot \overline{SNR_2}),$$

where $$\overline{SNR_1} = \frac{P_1 \cdot w_1^H h_1 h_1^H w_1}{P_2 \cdot w_2^H h_1 h_1^H w_2} \text{ and } \overline{SNR_2} = \frac{P_2 \cdot w_2^H h_2 h_2^H w_2}{P_1 \cdot w_1^H h_2 h_2^H w_1}.$$

Ideally, it may be preferred to maximize an average sum-rate for the two UEs, $$\max_{w_1, w_2} E_{h_1, h_2}[C].$$

By applying Jensen's upper bound for logarithmic functions, maximizing the average sum-rate for the two UEs reduces to maximizing a cost function expressible as:

$$\frac{P_1 \cdot w_1^H R_1^H w_1}{P_2 \cdot w_2^H R_1^H w_2} \cdot \frac{P_2 \cdot w_2^H R_2 w_2}{P_1 \cdot w_1^H R_2 w_1} = \left(\frac{w_1^H R_1 w_1}{w_1^H R_2 w_1}\right)\left(\frac{w_2^H R_2 w_2}{w_2^H R_1 w_2}\right),$$

where $R_1$ and $R_2$ are the second order statistics from the UEs.

The cost function may be separable, therefore, the cost function may be solved by separately solving two generalized eigen-problems:

$$\max_{w_1} \frac{w_1^H R_1 w_1}{w_1^H R_2 w_1} \text{ and } \max_{w_2} \frac{w_2^H R_2 w_2}{w_2^H R_1 w_2}.$$

The beamforming vectors $w_1$ and $w_2$ may be given by the eigen vectors corresponding to the maximum eigen value and the minimum eigen value of matrix $R_2^{-1} R_1$, namely:

$$R_2^{-1} R_1 \cdot w_1 = \lambda_{max} \cdot w_1,$$

and $$R_2^{-1} R_1 \cdot w_2 = \lambda_{min} \cdot w_2.$$

The maximum eigen value and the minimum eigen value may be computed as:

$$\lambda_{max} = \frac{w_1^H R_2^{-1} R_1 w_1}{w_1^H w_1} \text{ and } \lambda_{min} = \frac{w_2^H R_2^{-1} R_1 w_2}{w_2^H w_2}.$$

The beamforming vectors $w_1$ and $w_2$ may be computed using well known eigen vector solving techniques, such as, power iteration for calculating a most dominant eigen vector, inverse iteration for calculating a least dominant eigen vector. Other eigen vector solving techniques include QR iteration, Rayleigh Iteration, Lanczos algorithm, and variants and combinations thereof A regularization factor (a constant multiple of an identity matrix) may be added by the eNB to help avoid numerical problems often associated with small eigen values of covariance matrices. Regularization factors are considered to be well-known by those of ordinary skill in the art of the embodiments and will not be discussed further herein.

After computing the beamforming vectors $w_1$ and $w_2$, the eNB may select UEs from the UEs that reported second order statistics for transmissions (block 415). For example, if a plurality of UEs reported second order statistics, then there may be more UEs than available transmission opportunities. The eNB may need to select UEs from the plurality of UEs reporting second order statistics and transmit only to the selected UEs. For example, if there are four UEs reporting second order statistics and there are only sufficient network resources for two transmission opportunities, then the eNB may select two UEs from the four UEs reporting second order statistics. Alternatively, if there are sufficient network resources, then the eNB may select all UEs reporting second order statistics.

The eNB may use the beamforming vectors to transmit information to the selected UEs (block 420). The beamforming vectors may be used either in a single user unit, such as single user block 225, or a multi-user block, such as multi-user block 230, to provide beamforming vectors needed for either single user or multi-user operation. The beamforming vectors may then be provided to a transmit beamforming unit, such as transmit beamforming block 220, to beamform the transmit information to the UEs. eNB operations 400 may then terminate.

Figure 5:
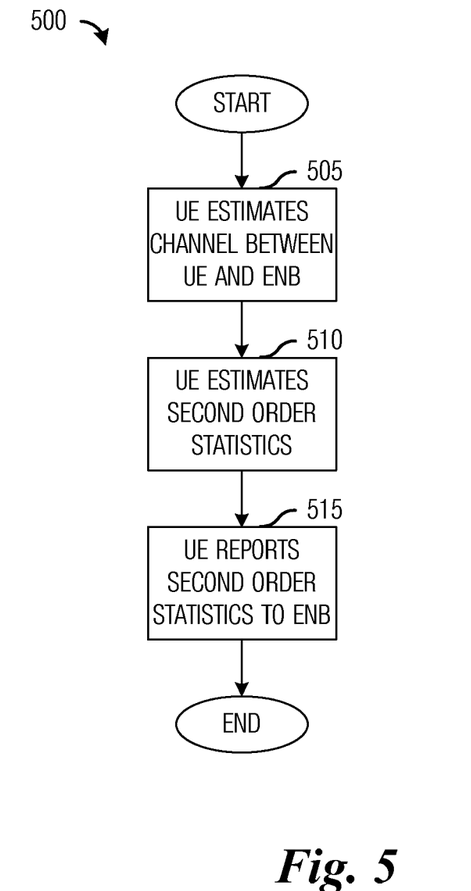
FIG. 5 is a flow diagram of UE operations in providing second order statistics to an eNB.

FIG. 5 illustrates a flow diagram of UE operations 500 in providing second order statistics to an eNB. UE operations 500 may be indicative of operations taking place at a UE, such as UE 310. UE operations 500 may occur while the UE is in normal operations and is providing channel information to its serving eNBs and/or relay nodes (RN) in the form of second order statistics to help improve communications system performance. UE operations 500 may continue as long as the UE is communicating with one or more eNBs and/or RNs. UE operations 500 may be scheduled to take place periodically. Alternatively, UE operations 500 may occur upon receipt of a command from an eNB and/or RN, or when a performance measure, such as an error rate, throughput, or so forth, meets a specified threshold, which may be an indication that performance is not occurring at optimum levels.

UE operations 500 may begin with the UE estimating a communications channel, $h_k$, where k is a number (e.g., identity of the UE), between the UE and its serving eNB (or RN) (block 505). Estimating the communications channel may be achieved by measuring pilot or reference sequences transmitted by the eNB (or RN). Alternatively, if the eNB (or RN) is not transmitting pilot or reference sequences, the UE may measure regular transmissions made by the eNB (or RN) over a period of time to obtain the estimate of the communications channel.

The UE may use the estimate of the communications channel $h_k$ to compute second order statistics of the communications channel (block 510). The second order statistics may be in the form of a spatial covariance matrix, $R_k$, and may be estimated from time-frequency samples of the communications channel, i.e., the estimate of the communications channel. For example, the spatial covariance matrix may be estimated as:

$$R_k = E[h_k h_k^H] \approx \frac{1}{|T||F|} \sum_{\substack{t \in T \\ f \in F}} h_k(t,f) h_k^H(t,f),$$

where E[.] is an expected value function, T is a set of time indices, and F is a set of frequency indices of samples of the communications channel.

The estimate of the spatial covariance matrix may be further smoothed over multiple time slots by filtering the estimate. For example, an exponential averaging filter may be used. In general, the smoothing may be performed using a finite impulse response (FIR) or an infinite impulse response (IIR) filter. The exponential averaging filter is a simple form of IIR filtering. More sophisticated filtering techniques, such as those using Kalman filters may also be possible, at the expense of additional complexity. A smoothed estimate of the spatial covariance matrix using an exponential averaging filter may be expressed as:

$$\overline{R}_k(t+1) = \beta \cdot \overline{R}_k(t) + (1-\beta) \cdot R_k(t),$$

where $\beta$ is the filtering coefficient, R(t) is the measured and $\overline{R}(t)$ are the filtered covariance matrices in the time slot t, respectively.

The second order statistics, e.g., either the estimate of the spatial covariance matrix or the smoothed estimate of the spatial covariance matrix, may be reported to the eNBs and/or the RNs serving the UE (block 515). Prior to reporting the spatial covariance matrix (either the estimate or the smoothed estimate), quantization may be performed to reduce the amount of information being fedback. UE operations 500 may then terminate.

Figure 6A:
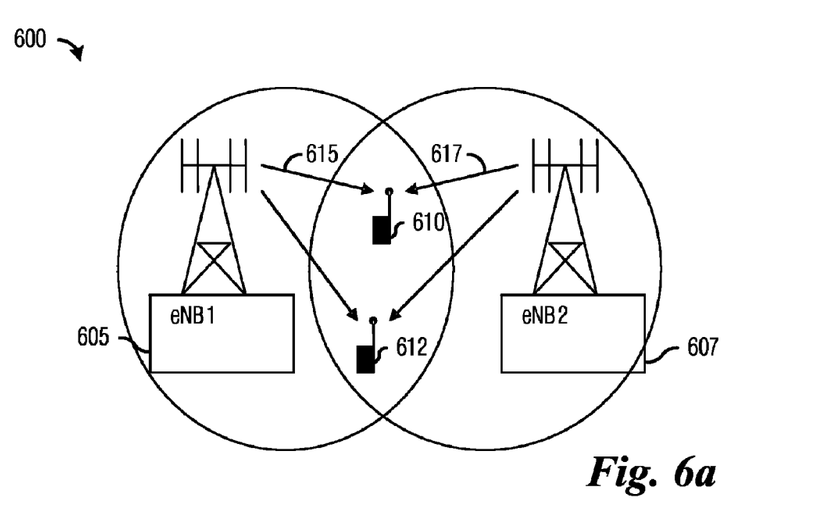
FIG. 6a is a diagram of a wireless communications system with multiple eNBs operating in multi-terminal coordinated spatial multiplexing.

FIG. 6a illustrates a wireless communications system 600 with multiple eNBs operating in multi-terminal coordinated spatial multiplexing. Wireless communications system 600 includes a first eNB "eNB 1" 605 and a second eNB "eNB 2" 607. As shown in FIG. 6a, first eNB 605 and second eNB 607 may transmit to each of two UEs, UE 610 and UE 612. Transmission of information to a single UE from multiple eNBs may help to further improve system performance by exploiting coordinated spatial multiplexing.

With more than one eNBs transmitting to a single UE (two eNBs as shown in FIG. 6a), there may be multiple communications channels to a single UE. For example, UE 610 may have a first communications channel 615 from first eNB 605 and a second communications channel 617 from second eNB 607. Each UE may need to provide second order statistics for each communications channel from each eNB serving the UE.

Figure 6B:
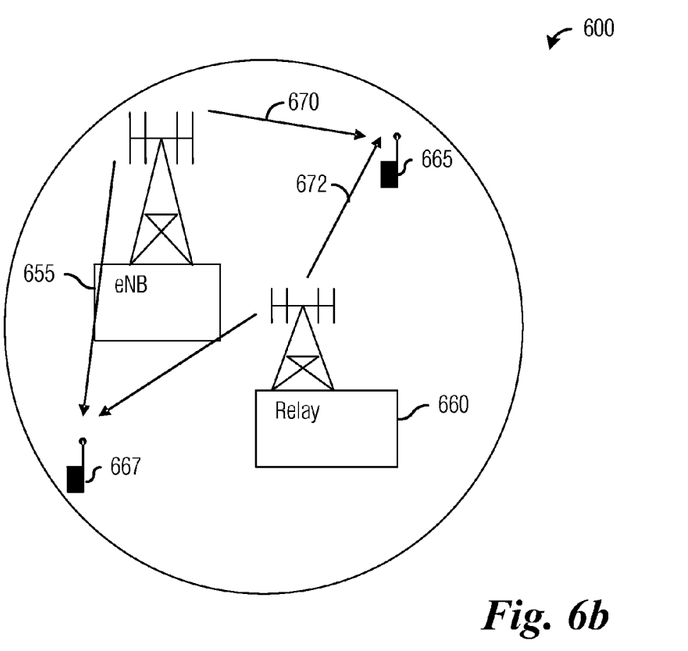
FIG. 6b is a diagram of a wireless communications system with an eNB and a RN operating in multi-terminal coordinated spatial multiplexing.

FIG. 6b illustrates a wireless communications system 650 with an eNB and a RN operating in multi-terminal coordinated spatial multiplexing. In Long Term Evolution and Long Term Evolution-Advanced, a relay node (RN) may be used in place of or in conjunction with an eNB to help improve system performance in situations wherein there may be lapses in coverage area, for example. To a UE being served by a RN, the RN appears identical to an equivalent eNB. However, in reality, the RN is utilizing network resources allocated to it by an eNB.

Wireless communications system 650 includes an eNB 655 and a RN 660. RN 660 receives network resources allocated to it by eNB 655. Using its allocated network resources, RN 660 may allocate network resources for transmissions to UEs that it is serving, such as UE 665 and UE 667, as well as transmissions from its serving UEs.

Since to UEs that it is serving, the RN appears to be an eNB, the UE may consider a communications channel from RN 660 to be equivalent to a communications channel from eNB 655. Therefore, the UEs may need to provide second order statistics for each communications channel. For example, for UE 665, UE 665 may need to provide second order statistics for communications channel 670 (from eNB 655) and communications channel 672 (from RN 660).

Although the discussion focuses on two UEs and two eNBs and/or RNs, the embodiments may be extended to more than two UEs and two eNBs and/or RNs. Therefore, the discussion of two UEs participating in multi-terminal coordinated spatial multiplexing with two eNBs and/or RNs should not be construed as being limiting to either the scope or spirit of the embodiments.

Figure 7:
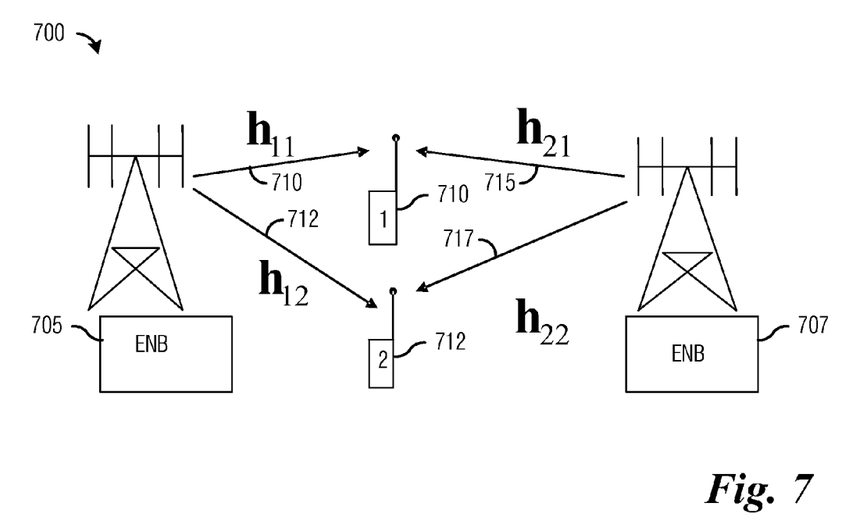
FIG. 7 is a diagram of a model of a wireless communications system communicating using multi-terminal coordinated spatial multiplexing using second order statistics from two UEs.

FIG. 7 illustrates a model of a wireless communications system 700 communicating using multi-terminal coordinated spatial multiplexing using second order statistics from two UEs. Wireless communications system 700 includes a first eNB 705 and a second eNB 707. The two eNBs participate in multi-terminal coordinated spatial multiplexing with two UEs, UE 710 and UE 712. A DL communications channel 710 from first eNB 705 to UE 710 may be denoted $h_{11}$, a DL communications channel 712 from first eNB 705 to UE 712 may be denoted $h_{12}$, a DL communications channel 715 from second eNB 707 to UE 710 may be denoted $h_{21}$, and a DL communications channel 717 from second eNB 707 to UE 712 may be denoted $h_{22}$.

Then, a received signal at UE 710 may be expressed as:

$$y_1 = [h_{11}^H \ h_{21}^H] \cdot \begin{bmatrix} w_{11} \\ w_{12} \end{bmatrix} \cdot \sqrt{P_1} \cdot s_1 + [h_{11}^H \ h_{21}^H] \cdot \begin{bmatrix} w_{21} \\ w_{22} \end{bmatrix} \cdot \sqrt{P_2} \cdot s_2 + n_1,$$

and a received signal at UE 712 may be expressed as:

$$y_2 = [h_{12}^H \ h_{22}^H] \cdot \begin{bmatrix} w_{11} \\ w_{12} \end{bmatrix} \cdot \sqrt{P_1} \cdot s_1 + [h_{12}^H \ h_{22}^H] \cdot \begin{bmatrix} w_{21} \\ w_{22} \end{bmatrix} \cdot \sqrt{P_2} \cdot s_2 + n_2,$$

where $h_{ij}^H$ is a DL channel from eNB i to UE j, $w_{ij}$ is a weight used in beamforming of transmissions from eNB i to UE j, $P_i$ is a transmit power of eNB i, $S_j$ is a transmit signal for UE j, and $n_j$ is noise for UE j.

As in the spatial multiplexing case discussed previously, $R_{11}=E[h_{11}h_{21}^H]$ and $R_{21}=E[h_{21}h_{21}^H]$ are the second order statistics for UE 710 for communications channel 710 and communications channel 715, while $R_{12}=E[h_{12}h_{12}^H]$ and $R_{22}=E[h_{22}h_{22}^H]$ are the second order statistics for UE 712 for communications channel 712 and communications channel 717. Furthermore, due to statistical independence of channel vectors, $E[h_{11}h_{21}^H]=E[h_{22}h_{12}^H]=0$.

eNB operations 400 may be used to transmit information to UEs using multi-terminal coordinated spatial multiplexing.

After receiving second order statistics for each communications channel from each UE, the eNB may compute weights used in beamforming (block 410). For example, weights $w_{11}$ and $w_{21}$ may be given by eigen vectors of $R_{12}^{-1}R_{11}$ corresponding to maximum and minimum eigen values, respectively. Similarly, weights $w_{12}$ and $w_{22}$ may be given by eigen vectors of $R_{21}^{-1}R_{22}$ corresponding to maximum and minimum eigen values, respectively.

UE operations 500 may be used to provide second order statistics to serving eNBs of the UE. After estimating the communications channels, the UE may estimate the second order statistics (e.g., spatial covariance matrices) from the time-frequency samples of the communications channels (block 510). Furthermore, smoothing of the second order statistics using an exponential averaging filter, for example, may be performed if desired.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
   receiving second order statistics from a plurality of communications devices;
   computing a beamforming vector for each communications device in the plurality of communications devices, wherein the beamforming vector for a communications device is based on the second order statistics provided by the communications device;
   selecting a subset of communications devices from the plurality of communications devices to receive transmissions; and
   transmitting transmissions to the selected subset of communications devices, wherein the transmitting uses the computed beamforming vector for each selected communications device to transmit the transmissions to the selected communications device,
   wherein the plurality of communications devices comprises two communications devices,
   wherein computing a beamforming vector comprises maximizing a sum-rate capacity for each of the two communications devices, and
   wherein the sum-rate capacity for the two communications devices is expressible as:

$C = \log_2(1+SNR_1) + \log_2(1+SNR_2)$ where $SNR_i$ is a signal-to-noise ratio for an i-th communications device.

2. The method of claim 1, wherein receiving second order statistics comprises receiving a spatial covariance matrix.

3. The method of claim 1, wherein the two communications devices are operating in a high SNR environment, and wherein maximizing the sum-rate capacity comprises maximizing a cost function expressible as:

$$\frac{w_1^H R_1^H w_1}{w_2^H R_1^H w_2} \cdot \frac{w_2^H R_2 w_2}{w_1^H R_2 w_1} = \left(\frac{w_1^H R_1 w_1}{w_1^H R_2 w_1}\right)\left(\frac{w_2^H R_2 w_2}{w_2^H R_1 w_2}\right),$$

where $R_i$ is second order statistics from the i-th communications device, $w_i$ is the beamforming vector for the i-th communications device, $w_i^H$ is a Hermitian of $w_i$, $R_i^H$ is the Hermitian of $R_i$ and i is 1 or 2.

4. The method of claim 3, wherein $w_1$ is an eigen vector corresponding to a maximum eigen value of matrix $R_2^{-1}R_1$, expressible as $R_2^{-1}R_1 \cdot w_1 = \lambda_{max} \cdot w_1$, and wherein $w_2$ is an eigen vector corresponding to a minimum eigen value of matrix $R_2^{-1}R_1$, expressible as $R_2^{-1}R_1 \cdot w_2 = \lambda_{min} \cdot w_2$, where is the maximum eigen value, $\lambda_{min}$ is the minimum eigen value, and $R_i^{-1}$ is an inverse of $R_i$.

5. The method of claim 1, wherein two controllers communicate with the two communications devices using multi-terminal coordinated spatial multiplexing, wherein $w_{ij}$ are beamforming weights used by a j-th controller to transmit to an i-th communications device, and wherein $w_{i1}$ is given by eigen vectors of $R_{12}^{-1}R_{11}$ corresponding to maximum and minimum eigen values and $w_{i2}$ is given by eigen vectors of $R_{21}^{-1}R_{22}$ corresponding to maximum and minimum eigen values, where $R_{ij}$ is the second order statistics for a i-th communications device from an j-th controller, and $R_{ij}^{-1}$ is the inverse of $R_{ij}$.

6. A method for communications device operations, the method comprising:
   estimating a communications channel between the communications device and a controller;
   estimating second order statistics for the communications channel based on the estimated communications channel;
   transmitting the second order statistics to the controller, wherein the second order statistics are used by the controller to compute a beamforming vector to be used in communications to the communications device; and
   receiving a transmission that uses the computed beamforming vector,
   wherein the communications device is communicating with two controllers using multi-terminal coordinated spatial multiplexing, and wherein estimating the second order statistics comprises, evaluating $R_{11}=E[h_{11}h_{21}^H]$ and $R_{21}=E[h_{21}h_{21}^H]$, where $R_{ij}$ is the second order statistics for a i-th communications device from an j-th controller, $h_{ij}$ is a communications channel between the j-th controller and the i-th communications device, $h_{ij}^H$ is the Hermitian of $h_{ij}$, and E[.] is an expected value function.

7. The method of claim 6, further comprising, prior to transmitting the second order statistics, smoothing the second order statistics.

8. The method of claim 7, wherein smoothing the second order statistics comprises filtering the second order statistics.

9. The method of claim 8, wherein filtering the second order statistics comprises applying an exponential averaging filter.

10. The method of claim 7, further comprising, prior to transmitting the second order statistics, quantizing the second order statistics.

11. The method of claim 6, wherein estimating a communications channel comprises sampling the communications channel at different times and frequencies, thereby producing time-frequency samples.

12. The method of claim 11, wherein sampling the communications channel comprises sampling a pilot sequence or a reference sequence transmitted by the controller over the communications channel.

13. The method of claim 12, wherein sampling the communications channel comprises sampling transmissions made over the communications channel for a period of time.

14. A method for communications device operations, the method comprising:
   estimating a communications channel between the communications device and a controller;
   estimating second order statistics for the communications channel based on the estimated communications channel, wherein the second order statistics comprise a spatial covariance matrix;
   transmitting the second order statistics to the controller, wherein the second order statistics are used by the controller to compute a beamforming vector to be used in communications to the communications device; and
   receiving a transmission that uses the computed beamforming vector, wherein estimating the second order statistics comprises evaluating $$R_k = E[h_k h_k^H] \approx \frac{1}{|T||F|} \sum_{\substack{t \in T \\ f \in F}} h_k(t, f) h_k^H(t, f),$$

where $R_k$ is the second order statistics for a k-th communications device, $E[.]$ is an expected value function, $h_k$ is a communications channel for the k-th communications device, $h_k^H$ is a Hermitian of $h_k$, T is a set of time indices, F is a set of frequency indices of samples of the communications channel, $h_k(t,f)$ is a time-frequency sample of $h_k$ at time t and frequency f, and $h_k^H(t,f)$ is a time-frequency sample of the Hermitian of $h_k$ at time t and frequency f.

* * * * *